(12) United States Patent
Chen et al.

(10) Patent No.: US 6,335,990 B1
(45) Date of Patent: Jan. 1, 2002

(54) SYSTEM AND METHOD FOR SPATIAL TEMPORAL-FILTERING FOR IMPROVING COMPRESSED DIGITAL VIDEO

(75) Inventors: Wen H. Chen, Sunnyvale; Ji Zhang; Fang Wu, both of San Jose, all of CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 08/985,377

(22) Filed: Dec. 4, 1997

Related U.S. Application Data
(60) Provisional application No. 60/051,728, filed on Jul. 3, 1997.

(51) Int. Cl.[7] .............................. G06T 5/10; G06T 5/20; G06T 5/50; G06K 9/40; H04N 1/409; H04N 5/21
(52) U.S. Cl. .................. 382/261; 382/265; 382/275; 348/607; 348/608; 348/618; 348/620; 375/240.29
(58) Field of Search ................................. 382/260, 261, 382/265, 264, 266, 275; 348/607, 608, 618, 619, 620; 375/240.29; 358/463

(56) References Cited

U.S. PATENT DOCUMENTS

| | | | |
|---|---|---|---|
| 5,438,374 A | 8/1995 | Yan | 348/620 |
| 5,442,407 A | 8/1995 | Iu | 348/620 |
| 5,493,456 A | 2/1996 | Augenbraun et al. | 360/64 |
| 5,502,489 A | 3/1996 | Kim et al. | 348/607 |

(List continued on next page.)

FOREIGN PATENT DOCUMENTS

| | | | | |
|---|---|---|---|---|
| EP | 0 796 010 A1 | * | 9/1997 | H04N/5/21 |
| EP | 1 032 196 A2 | * | 8/2000 | H04N/5/14 |
| EP | 1 100 260 A1 | * | 5/2001 | H04N/5/21 |

OTHER PUBLICATIONS

Motion Dependent Spatial Filtering for Image Coding; W. Chen, D. Klenke, L. Rennick, and D. Hein; Feb. 4, 1988; pp. 1–15; CLI–2017.

Recursive Temporal Filtering and Frame Rate Reduction for Image Coding; Wen–Hsiung Chen, David Hein, IEEE Journal on Selected Areas in Communications; vol. SAC–5, No. 7, Aug. 1987; pp. 1155–1165.

(List continued on next page.)

*Primary Examiner*—Scott Rogers
(74) *Attorney, Agent, or Firm*—Beyer Weaver & Thomas LLP

(57) ABSTRACT

A filter that filters in the spatial and temporal domain in a single step with filtering coefficients that can be varied depending upon the complexity of the video and the motion between the adjacent frames comprises: a IIR filter, a threshold unit, and a coefficient register. The IIR filter and threshold unit are coupled to receive video data. The IIR filter is also coupled to the coefficient register and the threshold unit. The IIR filter receives coefficients, a, from the coefficient register and uses them to filter the video data received. The IIR filter filters the data in the vertical, horizontal and temporal dimensions in a single step. The filtered data output by the IIR filter is sent to the threshold unit. The threshold unit compares the absolute value of the difference between the filtered data and the raw video data to a threshold value from the coefficient register, and then outputs either the raw video data or the filtered data. The present invention is advantageous because it preserves significant edges in video sequence; it preserves motion changes in video sequences; it reduces noise; and it uses minimal memory storage and introduces minimal processing delay. The present invention also includes methods for filtering in parallel the pixel data in one step for the horizontal, vertical and temporal dimensions.

21 Claims, 13 Drawing Sheets

U.S. PATENT DOCUMENTS

| | | | | |
|---|---|---|---|---|
| 5,502,510 | A | 3/1996 | Kim et al. | 348/701 |
| 5,512,956 | A | 4/1996 | Yan | 348/606 |
| 5,557,330 | A | 9/1996 | Astle | 348/394 |
| 5,570,197 | A | 10/1996 | Boon | 386/46 |
| 5,621,468 | A | 4/1997 | Kim | |
| 6,178,205 | B1 * | 1/2001 | Cheung et al. | 375/240.29 |

OTHER PUBLICATIONS

Noise Reduction in Image Sequences Using Motion–Compensated Temporal Filtering; Eric Dubois, Shaker Sabri, IEEE Transactions on Communications, vol. COM–32, No. 7, Jul. 1984; pp. 826–831.

Information Technology—Generic Coding of Moving Pictures and Associated Audio, ISO/IEC 1–13818–1, Nov. 13, 1994. (copy not provided).

Network and Customer Installation Interfaces—Asymmetric Digital Subscriber Line (ADSL) Metallic Interface; American National Standards Institute, ANSI T1. 413–1995. (copy not provided).

The ATM Forum Technical Committee User–Network Interface Specification, Version 3.1 (UNI 3.1); Aug. 18, 1995. (copy not provided).

Two Dimensional Signal Processing and Image Processing; S. Lim, Prentice Hall 1990, pp. 468–476. (copy not provided).

Wen–Hsiung Chen, "Recursive Temporal Filtering and Frame Rate Reduction for Image Coding", IEEE Journal on Selected Areas in Communications, vol. SAC–5, No. 7, Aug. 1987, pp. 1155–1165.

Jae S. Lim, "Two–Dimensional Signal and Image Processing", Chapter 8, pp. 468–476, Prentice Hall 1990.

Eric Dubois and Shaker Sabri, "Noise Reduction in Image Sequences Using Motion–Compensated Temporal Filtering", IEEE Transactions on Communications, vol. COM–32, No. 7, Jul. 1984, pp. 826–831.

* cited by examiner

200~# SYSTEM AND METHOD FOR SPATIAL TEMPORAL-FILTERING FOR IMPROVING COMPRESSED DIGITAL VIDEO

This application is based on a provisional application No. 60/051,728 filed Jul. 3, 1997.

BACKGROUND OF THE INVENTION

1. Field of the Invention

The present invention relates generally to systems and methods for filtering electrical signals. In particular, the present invention relates to a system and method for improving the quality of compressed digital video signals with a filtering method that reduces noise and preserves the significant details of the video sequence. Still more particularly, the present invention relates to a system and method for performing spatial-temporal filtering on video data.

2. Description of the Background Art

Digital video filtering is the process applied to a digital video sequence before or/and after compression and decompression that reduces the amount of noise and details in the sequence so that the quality of the digital video is enhanced. The prior art provides a variety of systems and methods for performing digital video filtering. For example, the use of temporal filtering for video coding is well known in the prior art. There have been a variety of attempts to increase video quality using specific types of temporal filtering. Temporal noise can be reduced by simple frame averaging, however, it is at the expense of blurring the moving objects.

Another prior art approach has also tried to resolve this deficiency in temporal filtering and avoid the blurring of moving objects. To permit noise reduction in the moving objects, this other prior art approach extracted motion information between the successive frames to bring the objects in line with each other. The extraction of the motion information is generally carried out on a blocks of pixels basis. Since the moving objects hardly line up with block exactly, there exists an ambiguity between the background and moving information. There is yet another prior art approach that utilizes the information in the current, prior and future frames to improve the subsequent coding efficiency. However, this process requires additional memory and additional delay because of the use of information in the future frames.

In still further prior art approaches, different filter coefficients have been used. The relative weighting (filtering coefficients) applied to the pixel in the current frame and the pixels in the prior/future frames are generally variable and can be predetermined. In one method, time-varying filtering coefficients dependent upon the relative motion between a block of current pixels and stored pixels was used to determine the extent of filtering. In a second method, the video frames are classified into different regions dependent upon the moving objects and different filtering coefficients are applied to the regions. However, the difficulty with these prior art approaches is that since the filtering is performed on fixed blocks or regions of pixels, the filtering process introduces undesirable blocking artifacts.

To extend the filtering process beyond the temporal domain, a motion adaptive spatial filter, that takes advantage of human visual system's inability to discriminate details in moving regions, was introduced to filter the moving objects. The same scheme was proposed to reduce the temporal aliasing resulting from coding video at less than its original frame rate. While this results in better image quality, it introduces significant delay in processing because the motion adaptive spatial filter must be cascaded with the temporal filter. Moreover, these prior art filtering processes introduce undesired spatial blurring of edge and motion information.

An attempt to improve the temporal and spatial filtering described above, the prior art has also alternatively used temporal and spatial filtering. One prior art method uses a temporal filter on those blocks of pixels with insignificant changes, and a spatial filter for those blocks of pixels with significant changes to smooth out the block pixels. In another filtering method, a similar alternatively temporal or spatial filter was used as a post-processing technique to reduce the artifacts of the video sequences generated by block-based, motion compensated transform coding. The difficulty with both these prior art solutions is that it is very difficult to determine which block to filter with the spatial filter and which block to filter with the temporal filter. This in turn can cause the resulting hardware and software for performing filtering to be complex and expensive. Furthermore, since the filtering is done on a block-by-block basis, undesirable artifacts continue to be introduced by the filtering.

Therefore, there is a need for a system and method for digital video filtering such that significant edge information and motion changes are preserved while reducing noise using minimal amounts of memory storage and introducing minimal delay.

SUMMARY OF THE INVENTION

The present invention overcomes the deficiencies and limitations of the prior art with a system and method for performing spatial-temporal filtering on video data. The system and method of the present invention are particularly advantageous because they filter in both spatial and temporal domain in a single step with the filtering coefficients that can be varied depending upon the complexity of the video and the motion between the adjacent frames. The present invention is also advantageous because it preserves significant edges in video sequence; it preserves motion changes in video sequences; it reduces noise; and it uses minimal memory storage and introduces minimal processing delay.

The present invention is a filter that is used in a video processing system and is alternatively used to process raw video data before compression or process video data after it has been compressed and decompressed. A preferred embodiment of a filter constructed according to the present invention comprises: a IIR filter, a threshold unit, and a coefficient register. The IIR filter and threshold unit are coupled to receive video data. The IIR filter is also coupled to the coefficient register and the threshold unit. The IIR filter receives coefficients, a, from the coefficient register and uses them to filter the video data received. The IIR filter is preferably a 2-tap recursive IIR filter, and provides single step temporal and spatial filtering. The filtered data output by the IIR filter is sent to the threshold unit. The threshold unit compares the absolute value of the difference between the filtered data and the raw video data to a threshold value from the coefficient register, and then outputs either the raw video data if the difference is above the threshold, or outputs the filtered data if the difference is not above the threshold.

A preferred method for performing filtering according to the present invention comprises the steps of: identifying and receiving the pixel data that is to be filtered; filtering the identified pixel data recursively with an IIR filter to produce filtered data; reducing the identified pixel data by the filtered data to produced a reduced value (y-x); determining whether the absolute value of the reduced value is greater than a threshold; outputting the identified pixel data if the absolute value of the difference between the filtered data and the raw video data is greater than a threshold; and outputting the filtered data if the absolute value of the difference between the filtered data and the raw video data is not greater than a threshold. The present invention also includes other methods for filtering in parallel the pixel data in one step for the horizontal, vertical and temporal dimensions.

DETAILED DESCRIPTION OF THE PREFERRED EMBODIMENTS

The present invention is directed to a system and method for filtering that can be applied to digital video sequences to improve the efficiency and quality of the compressed digital video. The present invention applies a filtering algorithm to sequences that reduces the spatial and temporal noise prior to the compression or/and reduces the artifacts after the compression. The present invention can be used independently of the compression algorithm employed, and can be used with all known compression algorithms including, but not limited to the standards such as MPEG1, MPEG2, and MPEG4 for ISO (International Standards Organization) and H.261, H.262, H.263 for ITU (International Telecommunication Union).

Figure 1:
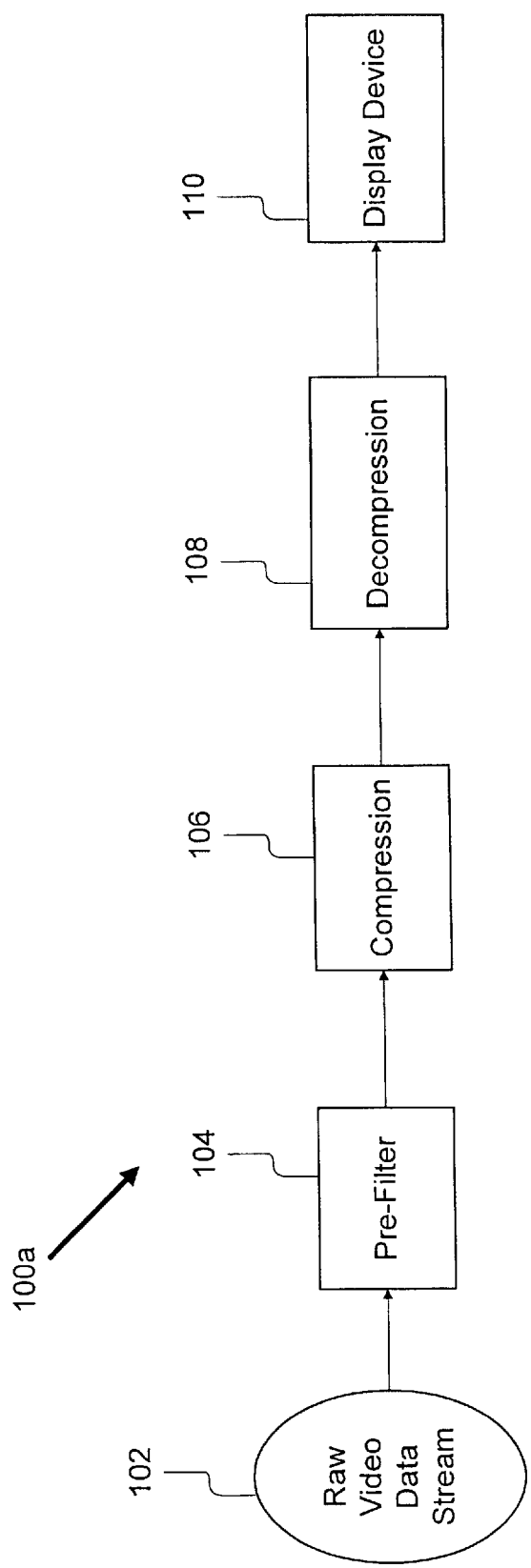
FIG. 1 is a block diagram of a video processing system including a preferred embodiment of a filter constructed according to the present invention used as a pre-filter.
Figure 2:
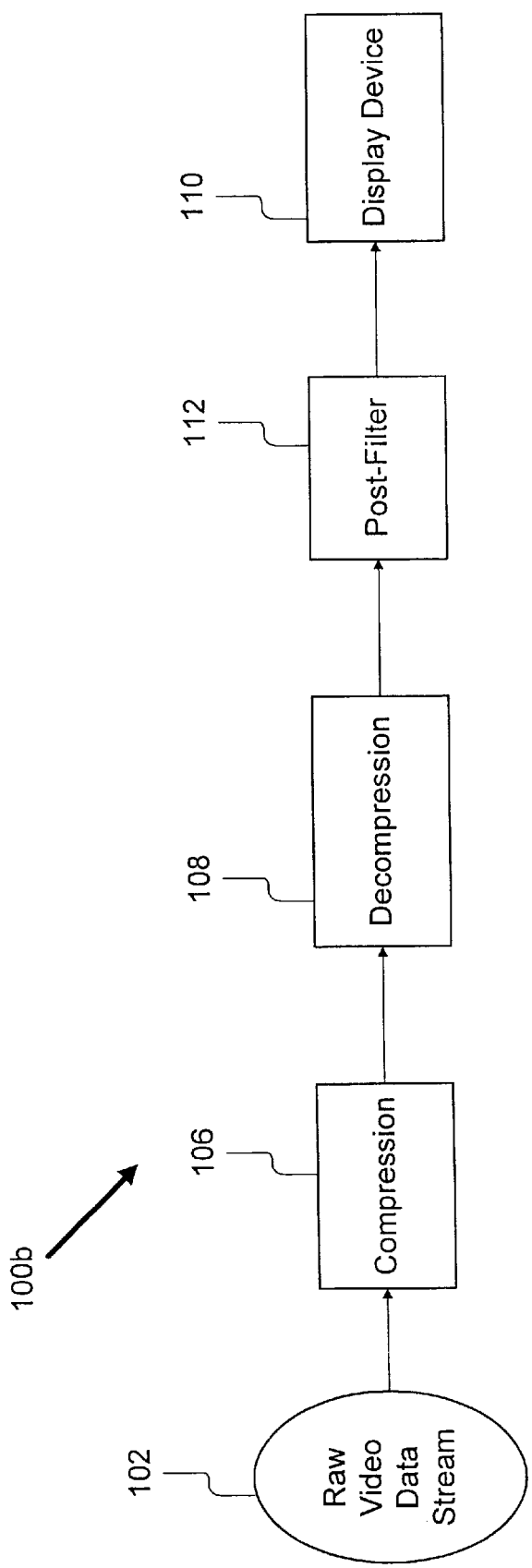
FIG. 2 is a block diagram of a video processing system including a preferred embodiment of a filter constructed according to the present invention used as a post-filter.

One particular advantage of the system and method for filtering of the present invention is that is can be used for filtering either before compression or filtering after decompression. Referring now to FIGS. 1 and 2, the use of the system and method for filtering in each respective scenario will be described. For convenience and ease of understanding, like number have been used for identical components in FIGS. 1 and 2. The present invention provides an simple structure that requires only minimum memory requirements to store a one pixel plus one line plus one frame.

Referring now to FIG. 1, a block diagram of a video processing system 100a is shown. This video processing system 100a illustrates use of a filter according to the present invention as a pre-filter 104. As shown, a stream of raw video data 102 is received at the input to the pre-filter 104. The pre-filter 104 processes and filters the data, and output the filtered data. The output of the pre-filter 104 is preferably coupled to a compression unit 106 to provide the filtered data. The compression unit 106 compresses the filtered video data and outputs the compressed data to the decompression unit 108. While the coupling between the compression unit 106 and the decompression unit 108 is shown as an electrical coupling, those skilled in the art will realize that the transmission of the compressed data may take a variety of formats including transfer across a LAN, transfer across the ISDN, transfer across the ATM, transfer across the Internet, transfer through the satellite, transfer through the cable TV or transfer to and from a floppy disk, CD-ROM or other similar suitable medium. The compressed data is provided on the input of the decompression unit 108. The decompression unit 108 in turn decompresses the data to recreate the filtered video data that is then sent to the display device 110 for presentation to the user. As used in the context of FIG. 1, the pre-filter 104 is preferably provided with coefficients (as will be described below) such that the filtered bit stream output after having been compressed and decompressed has a substantially better display quality as compared to bit streams that have not been filtered.

Referring now to FIG. 2, a block diagram of another embodiment for the video processing system 100b is shown. This video processing system 100b illustrates use of a filter according to the present invention as a post-filter 112. As shown, a stream of raw video data 102 is received at the input to the compression unit 106. The compression unit 106 compresses the video data and outputs the compressed data to the decompression unit 108. Again, the coupling between the compression unit 106 and the decompression unit 108 may take a variety of forms as has been discussed above. The compressed data is provided on the input of the decompression unit 108. The decompression unit 108 in turn decompresses the data to recreate the video data. The output of the decompression unit 108 is coupled to the input of the post-filter 112 to provide the video data for further processing. The post-filter 112 processes and filters the data, and outputs the filtered data to the display device 110. As used in the context of FIG. 2, the post-filter 112 is preferably provided with coefficients (as will be described below) such that the filter 112 reduces or eliminates the artifacts that were introduced by compression and decompression of the video data, especially where a limited bandwidth channel is used.

Before describing the preferred embodiments of the present invention, the definitions for digital video formats and notation used will first be described. While the preferred embodiments of the present invention will be later described using these standard digital video formats and notations, those skilled in the art will realize that the present invention may be used with a various other format and definitions.

Figure 3:
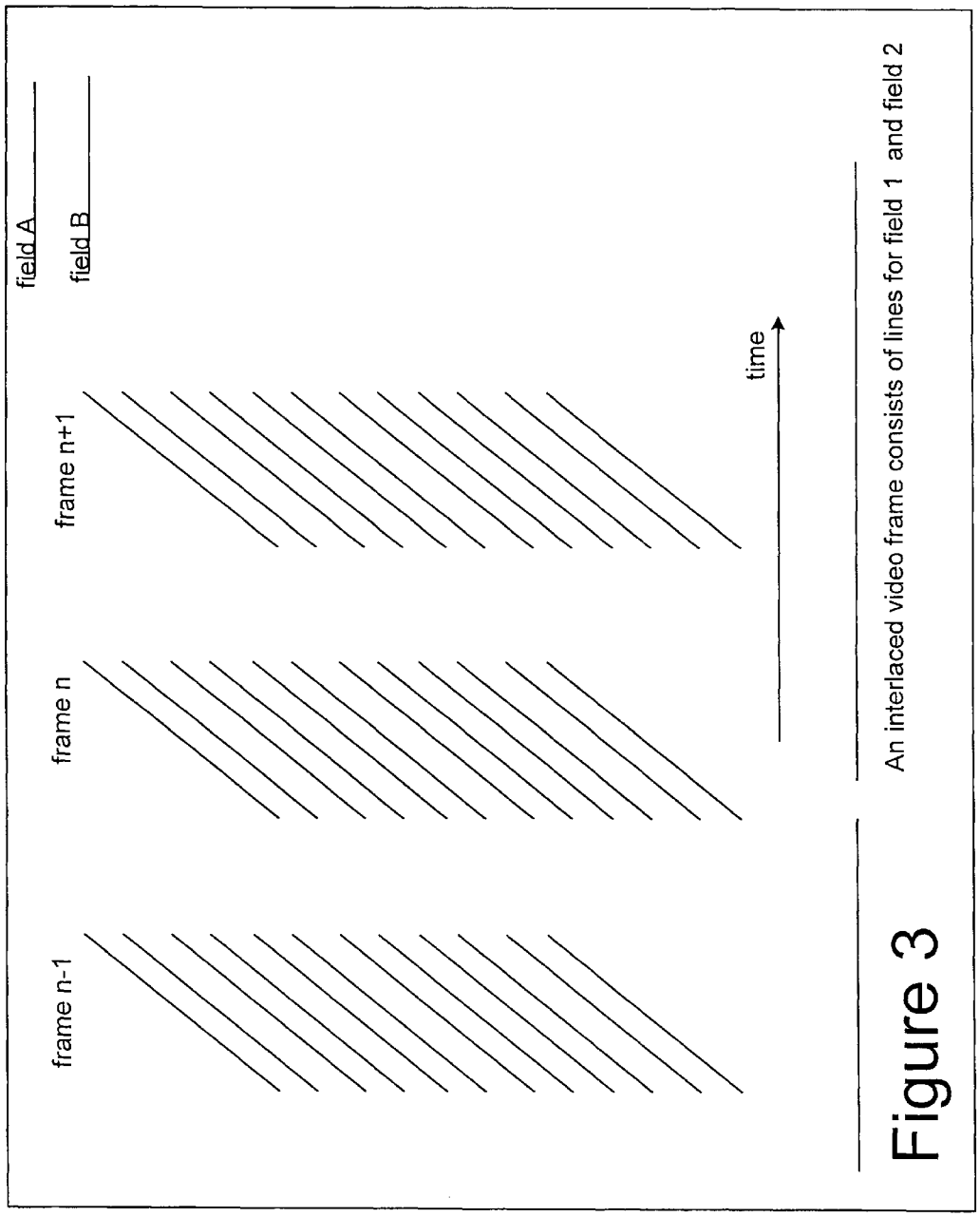
FIG. 3 is a graphical representation of several frames of video data.

Referring now to FIG. 3, a graphical representation of three interlaced frames n−1, n, n+1 of video data is shown.

The filter 104/112 of the present invention is applicable to both progressive scanned sequences such as movie and interlaced scanned sequences such as video. Since the progressive scanned data is equivalent to the field data within the frame, the present invention is discussed below in the context of interlaced video. As can be seen, the display of frames n−1, n, n+1 is typically in an interlaced fashion, meaning that for each frame two successive fields are rendered on the display device 110 one after the other. For example, for frame, n, the first field A would be rendered and then the second field B would be rendered. As shown in FIG. 3, the first field A comprises every other line in frame n beginning with the first line, and the second field B comprises every other line in frame n beginning with the second line.

The present invention is applicable to either of the standard formats for digital video data, namely, NTSC or PAL. Each of the standard formats for digital video data includes a number of lines including control data, video data and control signals like Hsync and Vsync. The delineation of the first active line of video data depends on whether the video format is NTSC or PAL. For NTSC, the first active video line is on field 2, and the frame rate is 29.97 frames/sec (or 59.94 fields/sec). For PAL, the first active video line is on field 1, and the frame rate for PAL is 25 frames/sec (or 50 fields/sec).

Figure 4:
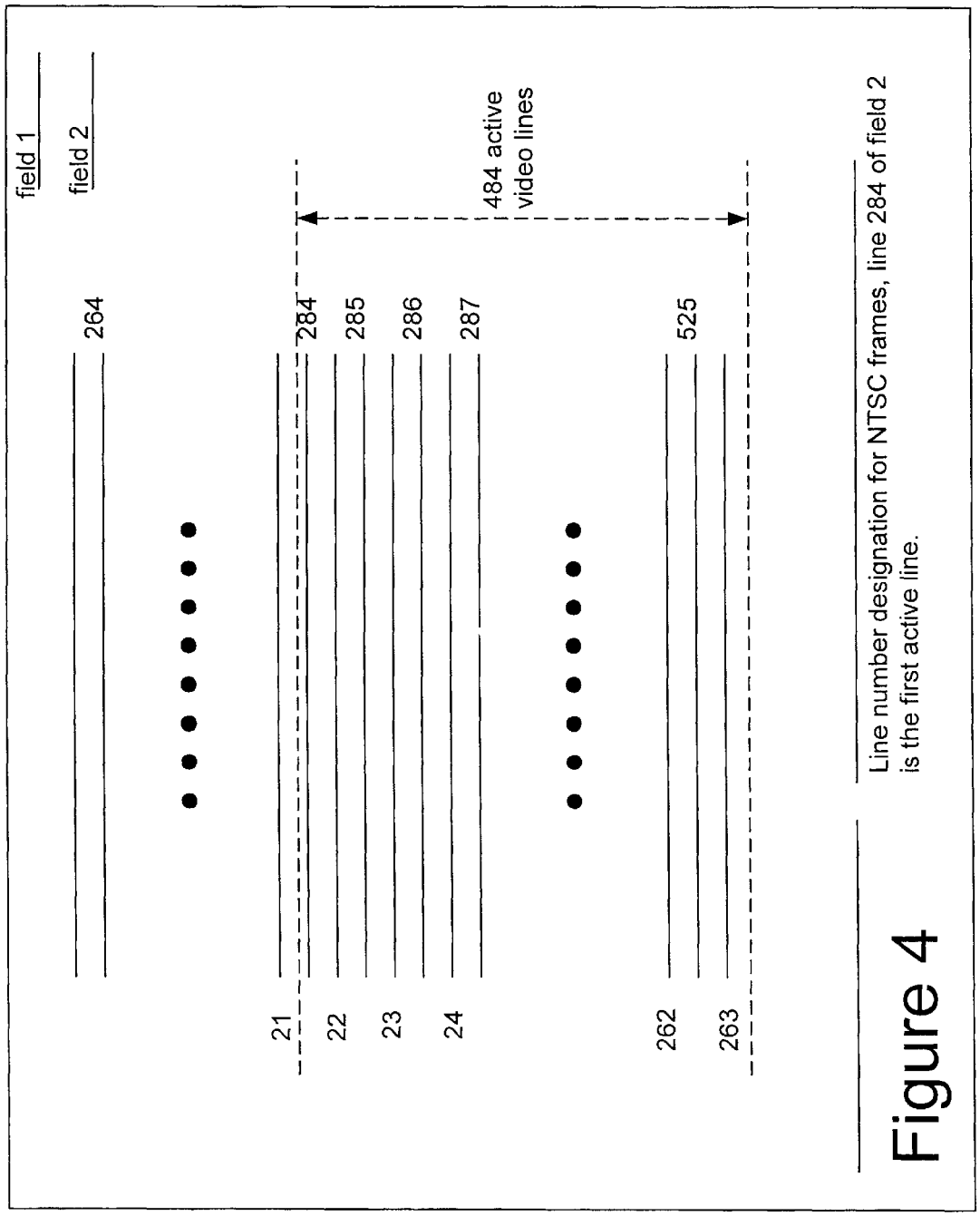
FIG. 4 is a graphical representation of a frame of video data formatted according to the NTSC standard.

As shown in FIG. 4, the frame structure according to the NTSC format is shown. The frame comprises 525 lines, 484 of which are active video lines and provide the video data. The line number designation of FIG. 4 follow that of conventional television engineering, and the lines of the frame are scanned from left to right, beginning with line 1, line 2, . . . etc. Line 284 of the frame (field 2 is the first active line.

Figure 5:
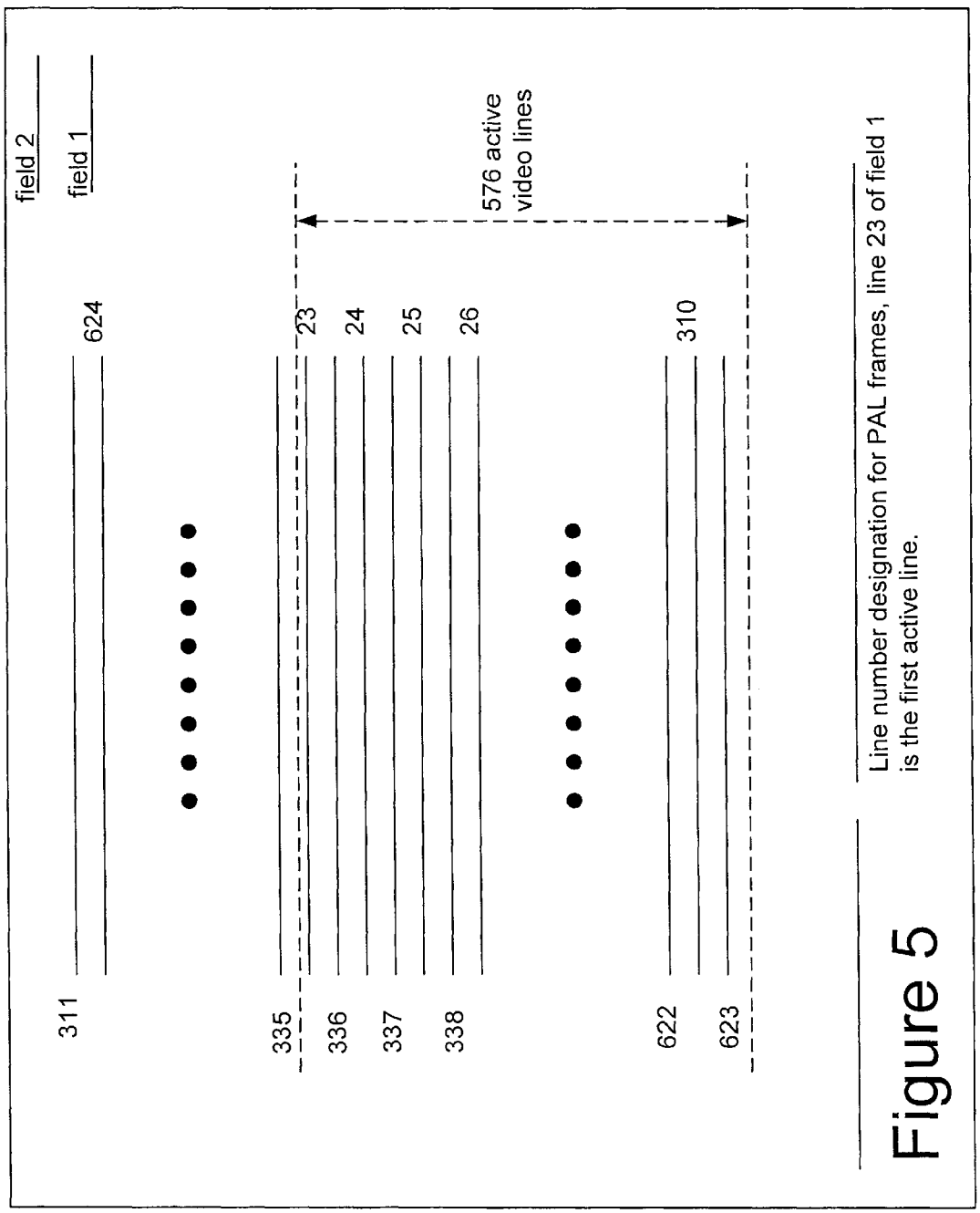
FIG. 5 is a graphical representation of a frame of video data formatted according to the PAL standard.

As shown in FIG. 5, the frame structure according to the PAL format is shown. The frame comprises 625 lines, 576 of which are active video lines and provide the video data. The line number designation of FIG. 5 follow that of conventional television engineering for PAL, and the lines of the frame are scanned from left to right, beginning with line 1, line 2, . . . etc. Line 23 of the frame (field 1 is the first active line for this format.

Figure 6:
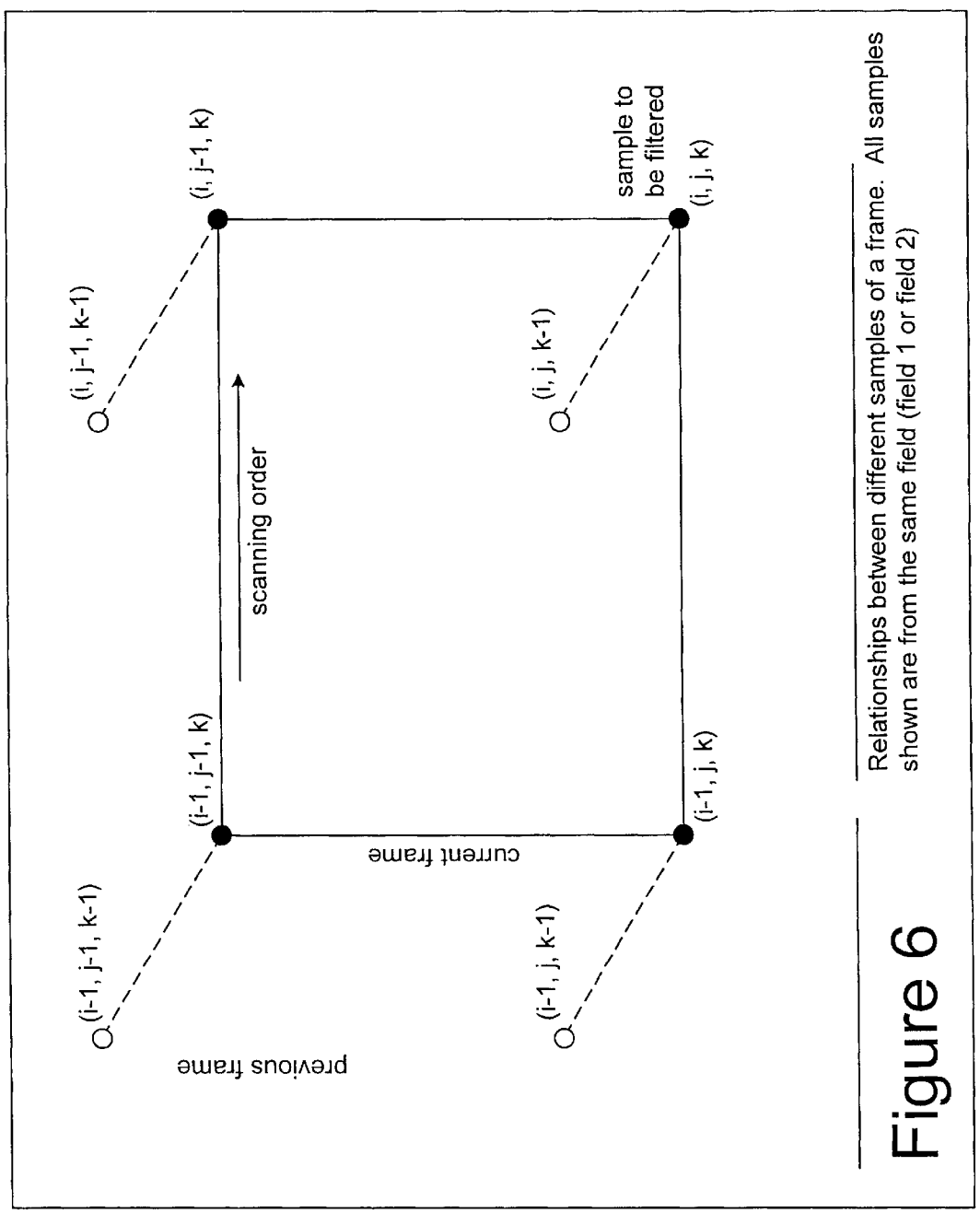
FIG. 6 is a graphical representation of a group of pixels from a current and previous frame of video data with a notation used for specifying pixel data.

Referring now to FIG. 6, a plurality of pixels from a previous and current frame k−1, k are shown. The pixels shown correspond to the same pixels (in vertical and horizontal position) from the same field. FIG. 6 is a graphical representation of a plurality of pixels, and graphically shows the notations that will be used throughout the remainder of this application. For convenience, we denote a digitized pixel at horizontal pixel position i, line j of frame k as in position (i, j, k). In addition, x(i, j, k) (16≦x(i, j, k)≦235) is defined as the original pixel value prior to filtering, y(i, j, k) as the output of the IIR (2-tap recursive linear) filter, and p(i, j ,k) as the resulting filtered sample value to replace the original sample value x(i, j, k).

Figure 7:
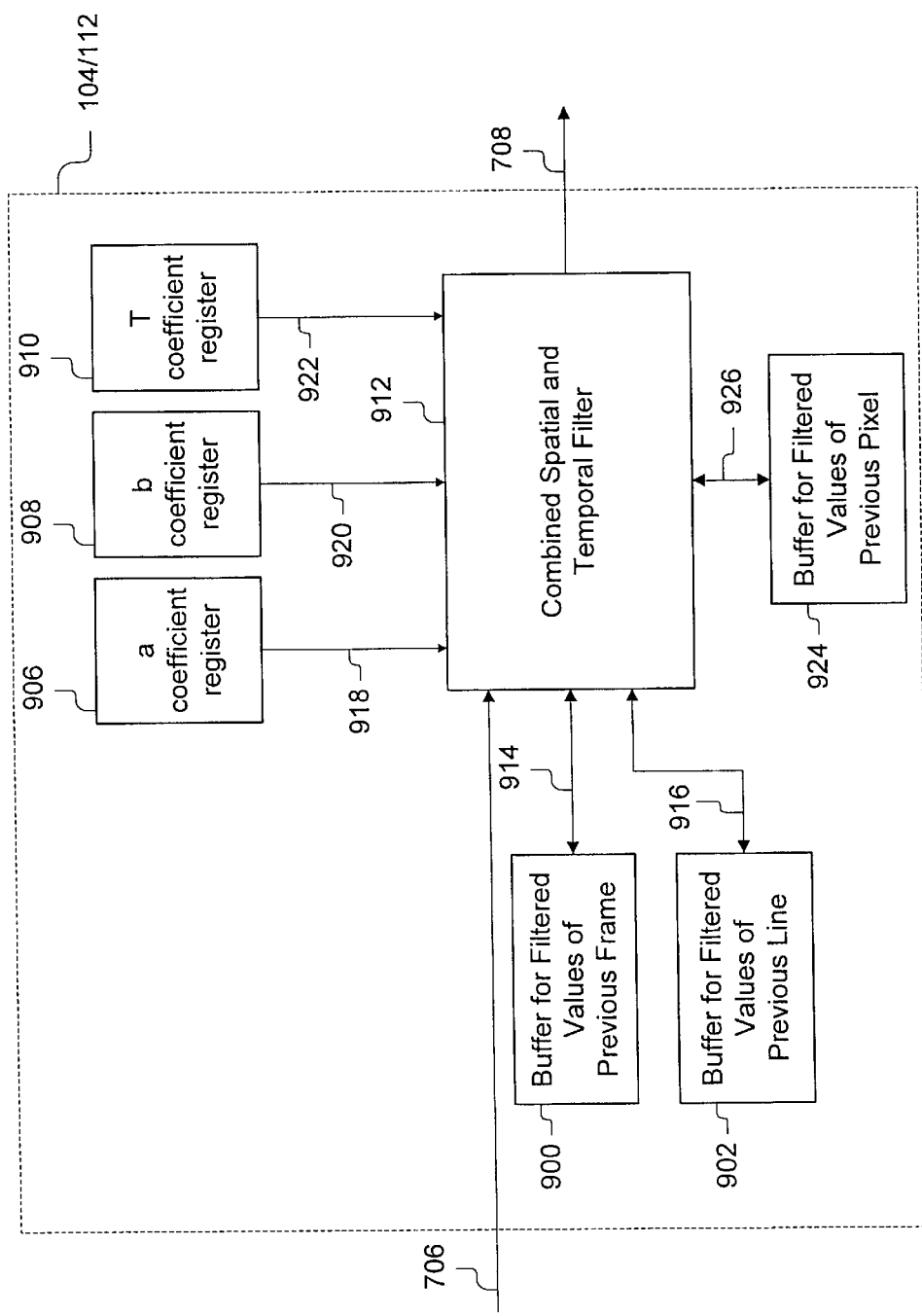
FIG. 7 is a block diagram showing a first and preferred embodiment of the filter constructed according to the present invention for three-dimensional filtering.
Figure 8:
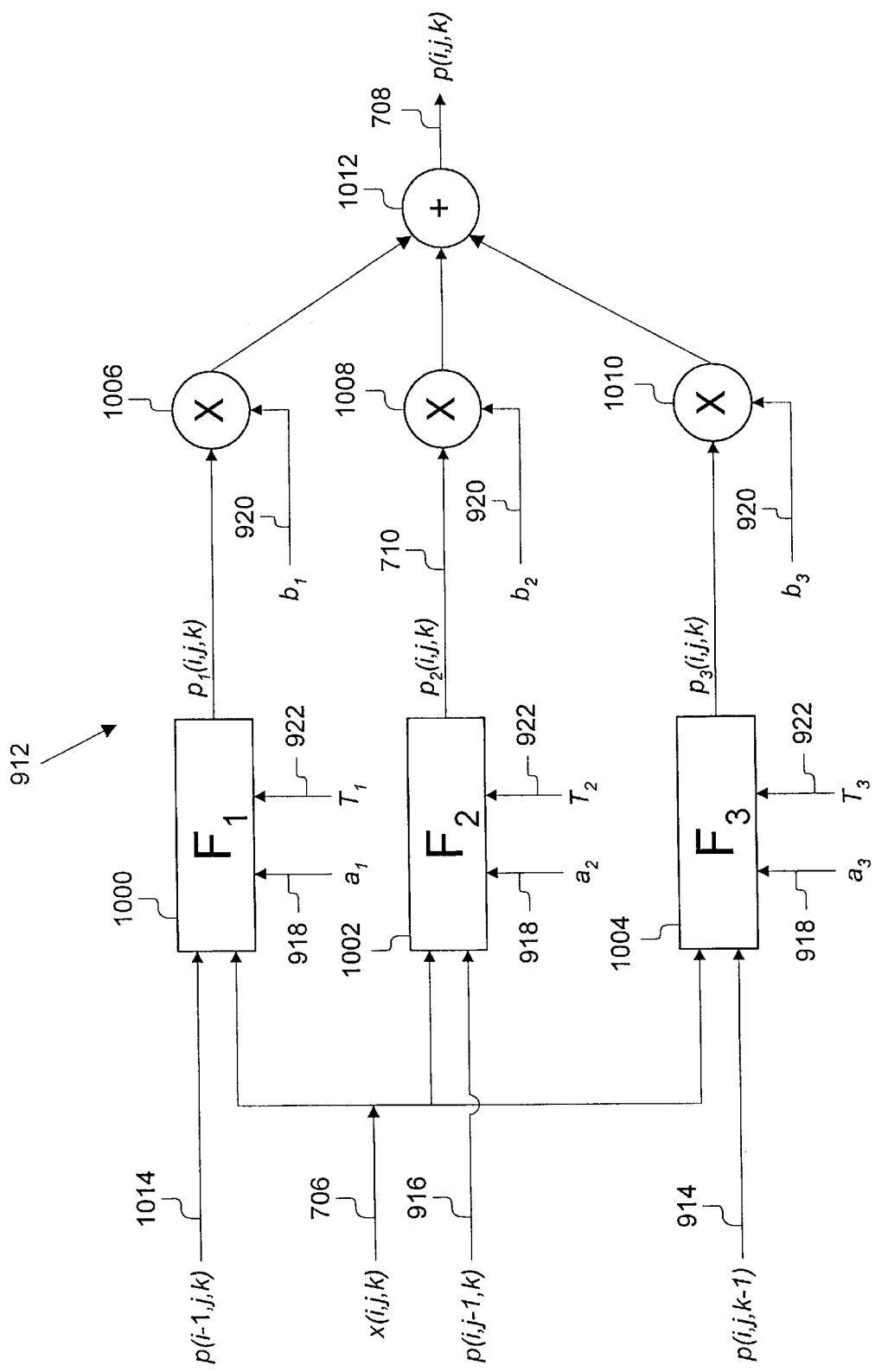
FIG. 8 is a schematic diagram showing a second and preferred embodiment of the filter constructed according to the present invention for three-dimensional filtering.

Referring now to FIGS. 7 and 8, a first and preferred embodiment of the present invention is shown. The first embodiment of the present invention can best be understood by reference to the mathematical operations underlying the present invention. For convenience, only the past pixels around the present pixel as illustrated in FIG. 6 are used in the present invention. The present invention can easily be extended to include the future pixels, as will be discussed in more detail below with reference to FIG. 13. First, a function f is defined as:

$$f_m(x, y_m) = \begin{cases} y_m & \text{if } |y_m - x| \leq T_m \\ x & \text{otherwise} \end{cases} \quad \text{(EQ 1)}$$

where m=1, 2,3 represent horizontal, vertical and temporal directions where $T_1, T_2, T_3 \geq 0$ are threshold constants. Second, define $$p_m(i,j,k) = f_m(x(i,j,k), y_m(i,j,k)) \quad \text{(EQ 2)}$$

for m=1, 2, 3. Third, construct three 2-tap IIR filters, one for each direction:

$$y_1(i,j,k) = a_1 x(i,j,k) + (1-a_1) p_1(i-1, j, k) \quad \text{(EQ 3)}$$

$$y_2(i,j,k) = a_2 x(i,j,k) + (1-a_2) p_2(i, j-1, k) \quad \text{(EQ 4)}$$

$$y_3(i,j,k) = a_3 x(i,j,k) + (1-a_3) p_3(i,j,k-1) \quad \text{(EQ 5)}$$

where for $0 \leq a_m \leq 1$ for m=1, 2, 3 and each am determines the degree of filtering that will be applied; the smaller the value of am, the greater the filtering. Fourth, let $$p(i, j, k) = \sum_{m=1,2,3} b_m p_m(i, j, k) \quad \text{(EQ 6)}$$

where $0 \leq b_m \leq 1$, and $b_1+b_2+b_3=1$. p(i, j, k) is the resulting pixel value at position (i, j, k).

Again referring to FIG. 7, the first and preferred embodiment of the filter 104/112 is shown. The first and preferred embodiment of the filter 104/112 comprises a first buffer 900, a second buffer 902, a third buffer 924, a combined spatial and temporal filter 912, and a plurality of registers 906, 908, 910 for storing filtering coefficient values a, b, T, respectively. The combined spatial and temporal filter 912 is preferably a three-dimensional filter. The combined spatial and temporal filter 912 advantageously improves the coding efficiency of the original sequence for pre-filtering and reduces the artifacts of the compressed sequence for post-filtering by providing optimum time varying. The combined spatial and temporal filter 912 has a plurality of inputs and an output. The combined spatial and temporal filter 912 has three inputs coupled to lines 918, 920 and 922 for receiving coefficient values a, b, T, from registers 906, 908, 910, respectively. These filtering coefficients are variable dependent upon the spatial and temporal contents of the sequence as well as the amount of frame-to-frame motion in successive frames, as will be described below. The combined spatial and temporal filter 912 also has a plurality of inputs coupled to lines 706, 914, 916 and 926 to receive pixel data, and previously filter values of adjacent pixels in the horizontal, vertical, and time (previous frame) dimensions. The first buffer 900 is preferably used to store values output by the filter for the previous frame, p(i,j,k−1), and is preferably a frame buffer. The first buffer 900 outputs these values on line 914 in response to control signals requesting such values from the combined spatial and temporal filter 912. The second buffer 902 performs a similar function, but stores the previously filtered values for current frame, namely the previous line, p(i, j−1,k). The second buffer 902 is preferably a line buffer, and therefore, much smaller than the first buffer 900 since only the previous line needs to be stored. The output of the second buffer 902 is coupled by line 916 to an input of the combined spatial and temporal filter 912. The third buffer 924 is used to store filtered values of the previous pixel, and therefore may be a buffer even smaller than the line buffer since it needs to store only the value of the previous pixel. One remaining input to the combined spatial and temporal filter 912 is coupled to line 706 to receive the raw data to be filtered, $x(i, j, k)$. As has been noted, the combined spatial and temporal filter 912 is advantageous because it: performs a both spatial and temporal filter while preserving the significant edge information and motion changes with a minimal memory storage and delay, it does not introduce spatial blurring of the edge and motion information, and provides a very high degree of flexibility of parameter controls.

Referring now to FIG. 8, the combined spatial and temporal filter 912 is shown in more detail. The combined spatial and temporal filter 912 preferably comprises a plurality of IIR filters 1000, 1002, 1004, a plurality of multipliers 1006, 1008, 1010, and an adder 1012. The combined spatial and temporal filter 912 basically filters each dimension in a manner described below with reference to FIGS. 9 and 10, then multiplies the filtered value by a weighting value and then sums the product for each dimension to provide the new filtered value for a particular pixel. This approach is particularly, advantageous because is provides very high degree of flexibility of parameter controls to the extent that the filter 912 of the present invention can used for both pre-compression filtering and post-decompression filtering.

FIG. 8 shows the plurality of IIR filters 1000, 1002, 1004 each having a pair of data inputs with one input coupled to receive the raw video data to be filtered. Each of the other data inputs for each IIR filter 1000, 1002, 1004 is respectively coupled to receive previously filtered data. In the preferred embodiment, there are three IIR filters 1000, 1002, and 1004. For example, a first IIR filter $F_1$ 1000 has first input coupled to line 706 to receive a current pixel value $x(i, j, k)$, and a second input coupled to line 1014 to receive a previous filtered pixel value $p(i-1, j, k)$. The $F_1$ filter 1000 also has inputs coupled to line 918 and line 922 to receive a value for the absolute difference function, $a_1$, and a threshold value, $T_1$. The $F_1$ filter 1000 provides a filtered pixel value $p_1(i, j, k)$ at its output. Similarly, the second IIR filter $F_2$ 1002 has first input coupled to line 706 to receive a current pixel value $x(i, j, k)$, and a second input coupled to line 916 to receive a previous filtered pixel value $p(i, j-1, k)$. The $F_2$ filter 1002 also has inputs coupled to line 918 and line 922 to receive a value for the absolute difference function, $a_2$, and a threshold value, $T_2$. The $F_2$ filter 1002 provides a filtered pixel value $p_2(i, j, k)$ at its output. Finally, the third IIR filter $F_3$ 1004 has first input coupled to line 706 to receive a current pixel value $x(i, j, k)$, and a second input coupled to line 914 to receive a previous filtered pixel value $p(i, j, k-1)$. The $F_3$ filter 1004 also has inputs coupled to line 918 and line 922 to receive a value for the absolute difference function, $a_3$, and a threshold value, $T_3$. The $F_3$ filter 1004 provides a filtered pixel value $p_3(i, j, k)$ at its output.

Once the current pixel has been filter in each dimension, each of the resulting pixel values is multiplied by a respective weighting (b) to determine the amount of weighting in each dimension. As shown in FIG. 8, the output of the $F_1$ filter 1000 is applied to the first input of a first multiplier 1006 and a first weighting $b_1$ is applied to a second input of the first multiplier 1006. Similarly for the second multiplier 1008, its first input is coupled to receive the output of the $F_2$ filter 1002, and its second input receives a second weighting $b_2$ on line 920. The third multiplier 1010 has its inputs similarly coupled to the output of the $F_3$ filter 1004, and to line 920 to receive a third weighting $b_3$. Each of the multipliers 1006, 1008, 1010 has its output coupled to an adder 1012 and the output of the adder provides the filter pixel result $p(i, j, k)$. The resulting filtered pixel value for filter Fm, $p(i, j, k)$ is advantageously different from the output of the linear 2-tap recursive filter if $|y_m(i, j, k)-x(i, j, k)|>T_m$, which is $y_m(i, j, k)$. Thus, the present invention can preserve the edges in the spatial domain and to preserve motion movements in temporal domain. In other words, if there is a sharp edge in the, say, horizontal direction, then the difference $|y_1(i, j, k)-x(i, j, k)|$ will be large, the output of $F_1$ is then the same as input $x(i, j, k)$. Therefore, the horizontal edge is preserved, at the same time, the 2-tap filter is initialized to the value $x(i, j, k)$ instead of the value $y_1(i, j, k)$. Similar argument can be made for other directions.

The filter 912 shown in FIG. 8 is particularly advantageous because of its ability to filter in the three dimensions simultaneously, and with many degrees of freedom provided by the parameters a, T, and b. Each of the parameters can be varied to produce a variety of effects during filtering. The values $a_1$, $a_2$, and $a_3$ control how much 2-tap recursive filtering is applied. For example, if $a_1$ is very small then very strong filtering will be applied in the horizontal direction. On the other hand, if $a_1$ is very close to 1, then there will be little filtering in the horizontal direction. $a_2$ controls the vertical filtering in similar way. $a_3$ controls the amount of temporal filtering in similar way. The actual am values are preferably chosen as 1 over power of 2, such as $(n/16)$ for $n=0, 1, 2, \ldots, 16$. This way, multiplication can be reduced to register down shifts. As mentioned earlier, each $a_m$ is the function of the absolute difference $|y_m-x|$; the smaller the absolute difference the smaller is the value of $a_m$.

Another parameter that can be used to change the filter 912 performance is the threshold values: $T_1$, $T_2$, and $T_3$. These three parameters determine the sensitivity to spatial or temporal changes. For example, if $T_1$ is very small, say, $T_1=0$, the condition $|y_1(i j, k)-x(i, j, k)|>T_1$ can be always met, then the filtered result $p_1(i, j, k)$ will be $x(i, j, k)$. In other words, the sample is not filtered. On the other hand, if $T_1$ is very large, say, $T_1>=235$, then the filtered result $p_1(i, j, k)$ will be $y_1(i, j, k)$ all the time. This is equivalent to applying uniform 2-tap IIR filter without edge detection. Similarly, the values of $T_2$ and $T_3$ have the same effect on sensitivity in the vertical direction and temporal direction as well. The assigning of values for $T_1$, $T_2$, and $T_3$ is dependent upon how much the edge and motion information is to be preserved.

The final parameter used in the filter 912 of the present invention are the weighting values for each dimension. Parameters $b_1$, $b_2$, and $b_3$ determine the relative amount of filtering in each direction. For example, if $b_1=0$, then there is no horizontal filtering, if $b_3=0$, then there is no temporal filtering. The assigning of $b_1$, $b_2$, and $b_3$ is dependent upon the complexity of the scene. As an example, $b_3$ should be large for the video conferencing scene and it should be small for the action type of scene such as basketball game.

The parameters described above are preferably applied on a field by field basis. No cross filtering is done between samples of opposing fields. Those skilled in the art will realize that filter 912 of the present invention may be refined in a number of ways that are considered to be part of the present invention. For example, more pixels in the neighborhood of the input pixel $(i, j, k)$ could be used in the filtering process. For example, the pixels in position $(i-1, j-1, k)$, $(i-1, j, k-1)$, $(i, j-1, k-1)$ can also be used to do the filtering. The algorithm could be simply expanded to include these pixels. The filter 912 could also be modified to provide more refined edge and motion detection. There are many sophisticated edge detection algorithms known in the art that may be used to replace the condition $|y_m(i, j, k)-x(i, j, k)|>T_m$ for m=1, 2, 3. Similarly, more refined motion detection can be used to replace the condition $|y_3(i, j, k)-x(i, j, k)|>T_3$. Furthermore, those skilled in the art will recognize that due to the difference in frame rates and resolutions, different sets of parameters used by the algorithm need to be used. For example, the value for $T_3$ should be smaller for NTSC than for PAL because PAL has lower frame rate, resulting in larger changes in temporal directions.

It should be noted that in the preferred embodiment of the present invention, any inactive lines are removed from the field before the pixel data is provided to the filter 912. The system preferably does not filter any of the inactive lines. These lines are normally reserved for closed captions, VITC signals and other information. Filtering pixels in this region will increase the detection error probability, and thus the present invention in the preferred embodiment does not filter them.

Figure 9:
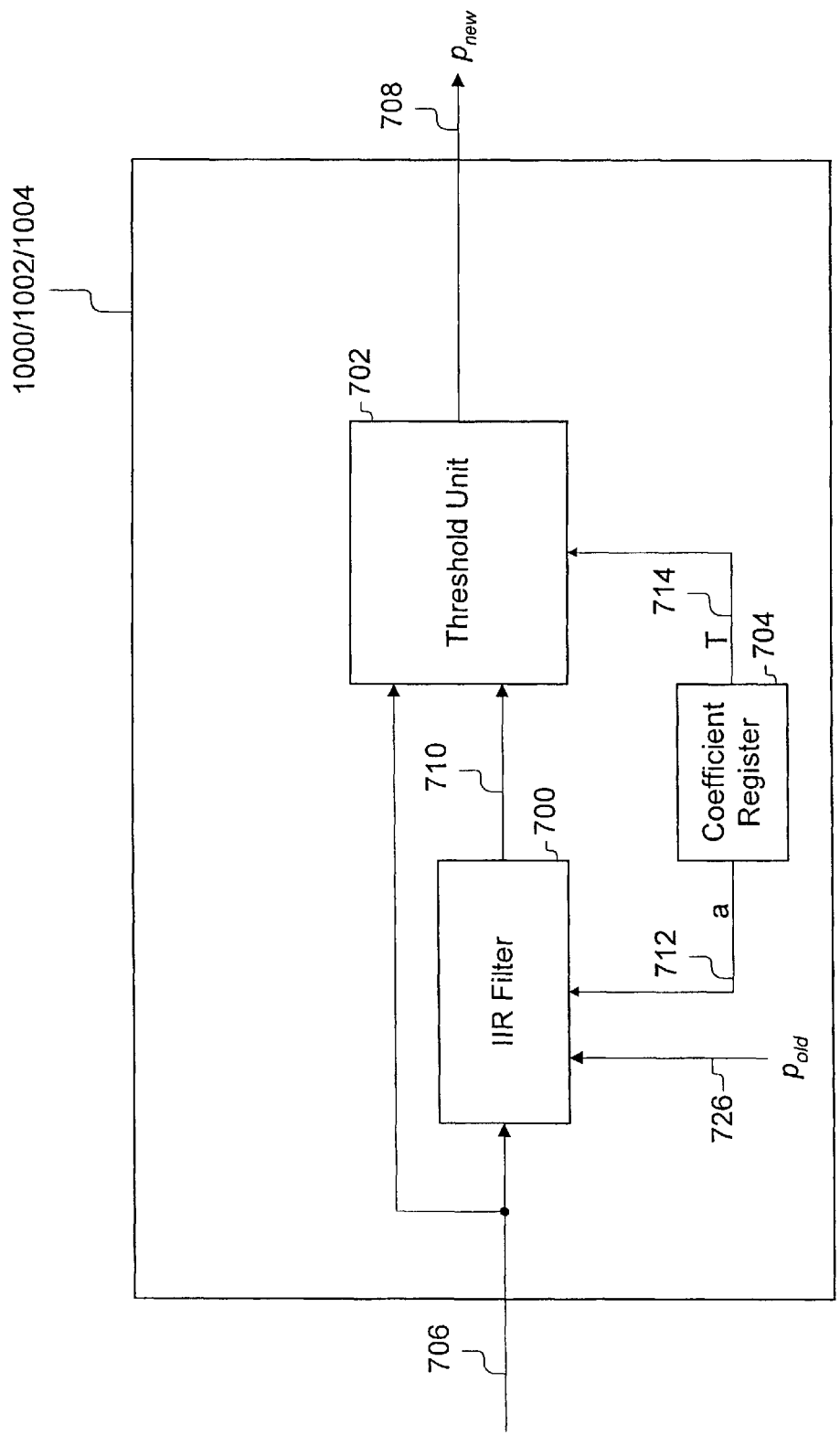
FIG. 9 is a block diagram showing a first embodiment of a one-dimensional filter, $F_m$, constructed according to the present invention.

Referring now to FIG. 9, a block diagram of a preferred embodiment of a one-dimensional filter 1000/1002/1004 constructed according to the present invention and for use as one $F_m$ is shown. The preferred embodiment of the filter 1000/1002/1004 comprises: a one-dimensional IIR filter 700, a threshold unit 702 and a coefficient register 704 for the horizontal, vertical or temporal dimensions. The filter 1000/1002/1004 has an input coupled to signal line 706 and an output provided on signal line 708. The IIR filter 700 and threshold unit 702 are coupled to receive video data. The IIR filter 700 has a first input coupled to line 706 to receive a video data signal, a second input coupled to line 726 to receive the value of the previously filtered pixel ($P_{old}$), a third input coupled to line 712 to receive signals from the coefficient register 704 and an output. The IIR filter 700 receives coefficients, a, from the coefficient register 704 and uses them to filter the video data and the old filtered data received. The IIR filter 700 is preferably a 2-tap recursive IIR linear filter. The IIR filter 700 preferably performs filtering according to the coefficients provided by the coefficient register 704. The coefficient register 704 is a conventional register for storing data and may be used to store various coefficient values. The filtered data output by the IIR filter 700 is provided on line 710 which is coupled to a first input of the threshold unit 702. A second input of the threshold unit 702 is coupled to line 706 to receive the original video data. The threshold unit 702 determines the absolute value of the difference between the filtered data on line 710 and the raw video data on line 706. The threshold unit 702 has a third input coupled to line 714 to receive a threshold value from coefficient register 704. The threshold unit 702 compares the determined absolute value to a threshold value, T, and then outputs on line 708 either the raw video data if the difference is above the threshold, or outputs the filtered data if the difference is not above the threshold.

Figure 10:
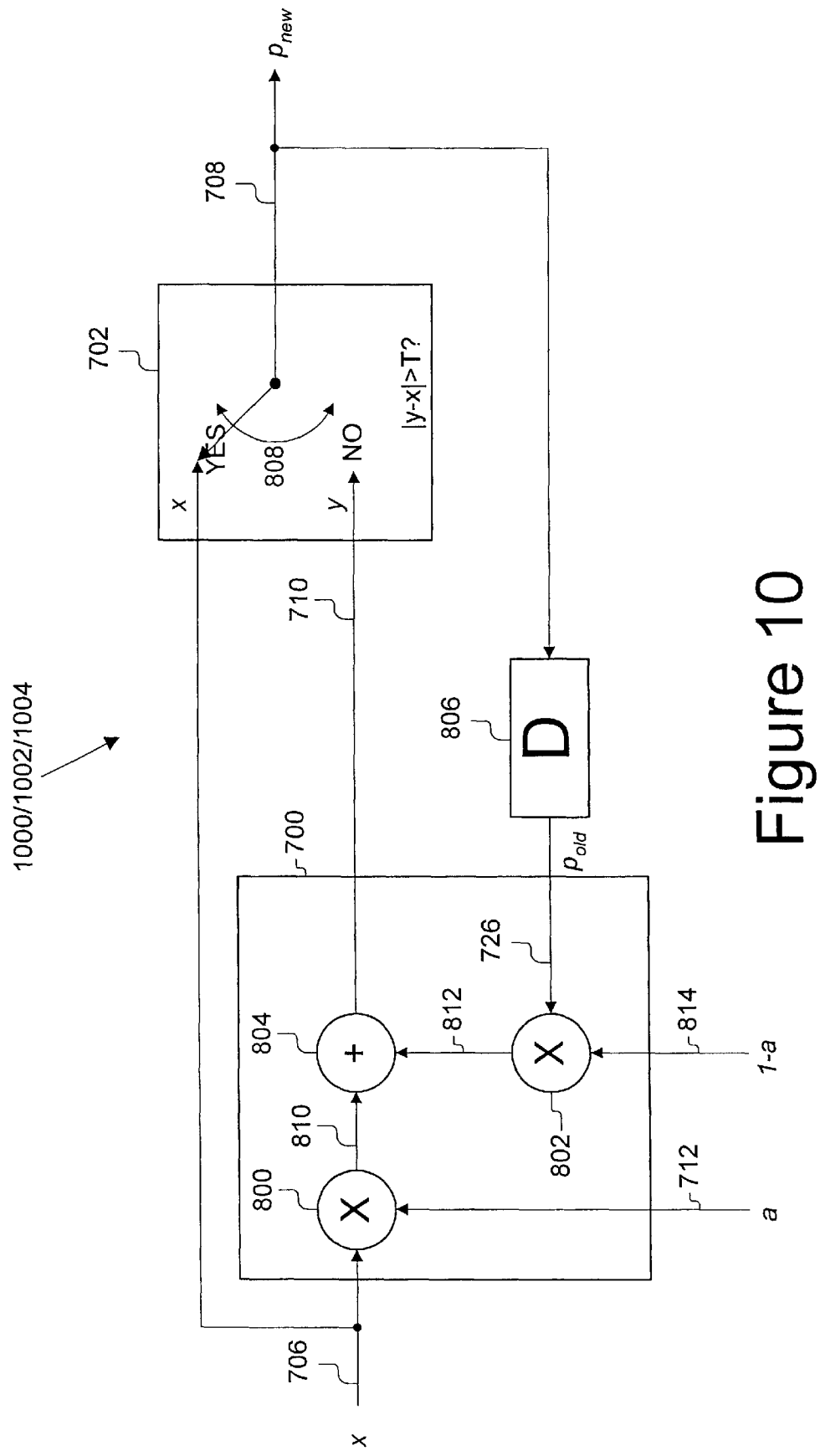
FIG. 10 is a schematic diagram showing the first embodiment of the one-dimensional filter, $F_m$, constructed according to the present invention.

FIG. 10 is a schematic diagram and shows additional details of the IIR filter 700 and the threshold unit 702 used in each filter 1000/1002/1004 of the three-dimensional filter 912. The filter 1000/1002/1004 comprises the IIR filter 700, a delay unit 806 and the threshold unit 702 formed of a multiplexer 808. As shown, the one-dimensional IIR filter 700 further comprises a first multiplier 800, a second multiplier 802, and an adder 804. The first multiplier 800 has a first input and a second input. The first input is coupled to line 706 to receive the video data, x. The second input of the first multiplier 800 is coupled to the coefficient register 704 to receive coefficient a on line 712. The first multiplier 800 multiplies the signals applied on the first and second inputs and outputs the product on line 810 to the first input of the adder 804. Similarly, the second multiplier 802 has a first input and a second input. The first input of the second multiplier 802 is coupled to receive the filtered sample value, $P_{old}$, and the second input of the second multiplier 802 is coupled to receive a second coefficient value, 1-α on line 814. The filtered sample value, $P_{old}$, is provided at the output of the delay unit 806. The value $P_{new}$ is delayed by the delay unit 806 by one pixel processing period, thereby providing the previously filtered value for the previous pixel. The second multiplier 802 multiplies the signals applied on the first and second inputs and outputs the product on line 812 to the second input of the adder 804. The adder 804 in turn sums the values applied to the inputs and outputs the sum or the filtered value on line 710 to the threshold unit 702. In one embodiment, the threshold unit 702 includes a multiplexer 808 having inputs coupled to receive the raw video data and the filtered video data. The multiplexer 808 outputs either the raw video data or the filtered video data in response to a control signal. The control signal is the result of comparing the absolute value of the x-y to a threshold value, T, received from coefficient register 704. The output of the multiplexer 808 provides the filtered value, $P_{new}$, on line 708.

Figure 11:
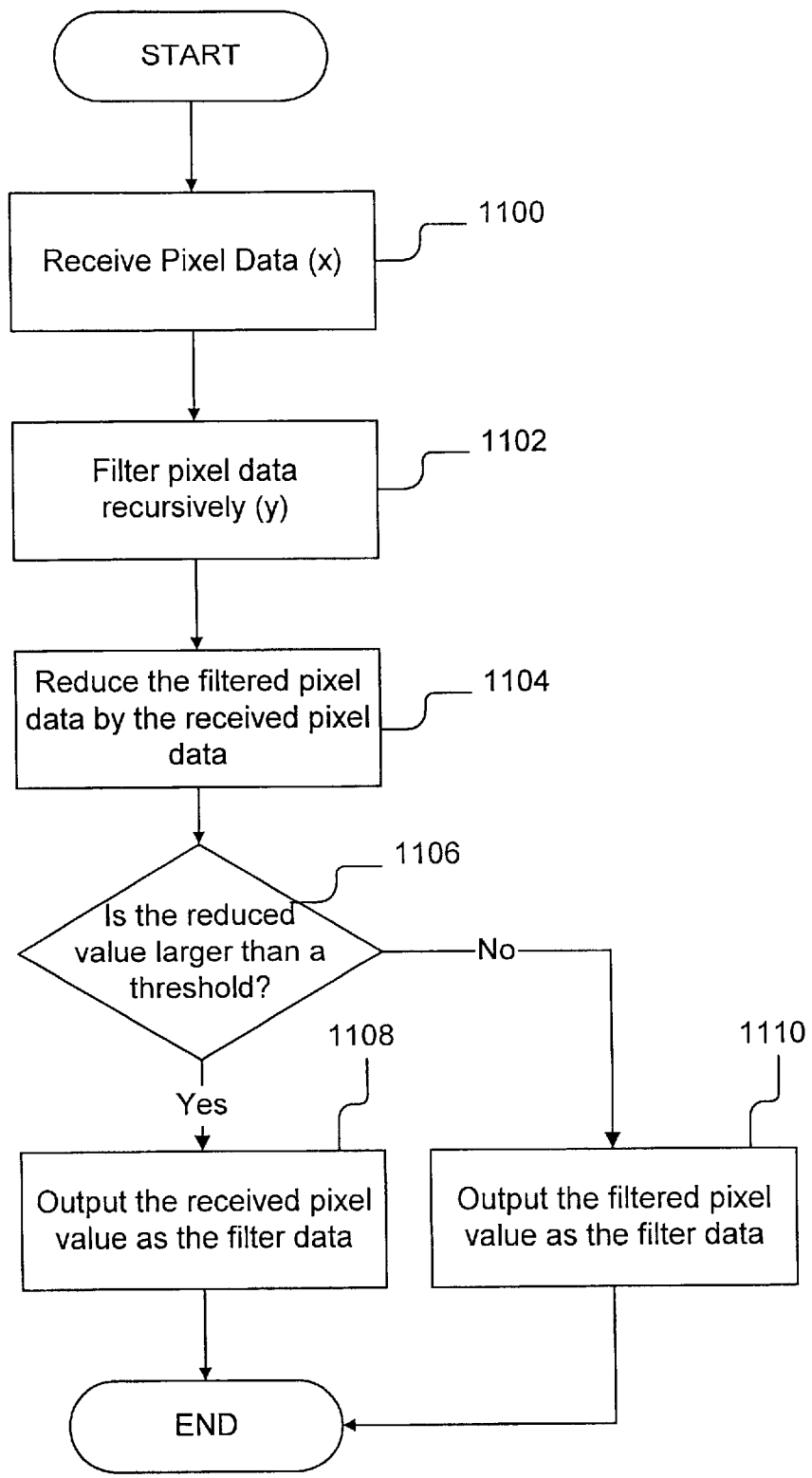
FIG. 11 is a flow chart showing a preferred method for filtering one dimension according the preferred embodiment of the present invention.

Referring now to FIG. 11, a flowchart of the preferred method for filtering pixel data in a single dimension is shown. The preferred method begins in step 1100 by receiving pixel data, x(i, j, k). Next in step 1102, the method filters the received data recursively with an IIR filter to produce a filtered pixel value y(i, j, k). Then in step 1104, the filtered pixel value y(i, j, k) is reduced by the received pixel value x(i, j, k). In other words, the reduced value is equal to the difference between y and x (y-x). Then in step 1106, the absolute value of the difference from step 1104 is compared with a threshold value. If the difference is larger than the threshold, then the method continues in step 1108 and outputs the received pixel value x(i, j, k) as the filtered values and the process is complete. If the difference is not larger than the threshold, then the method continues in step 1110 and outputs the filter filtered pixel value y(i, j, k).

Figure 12:
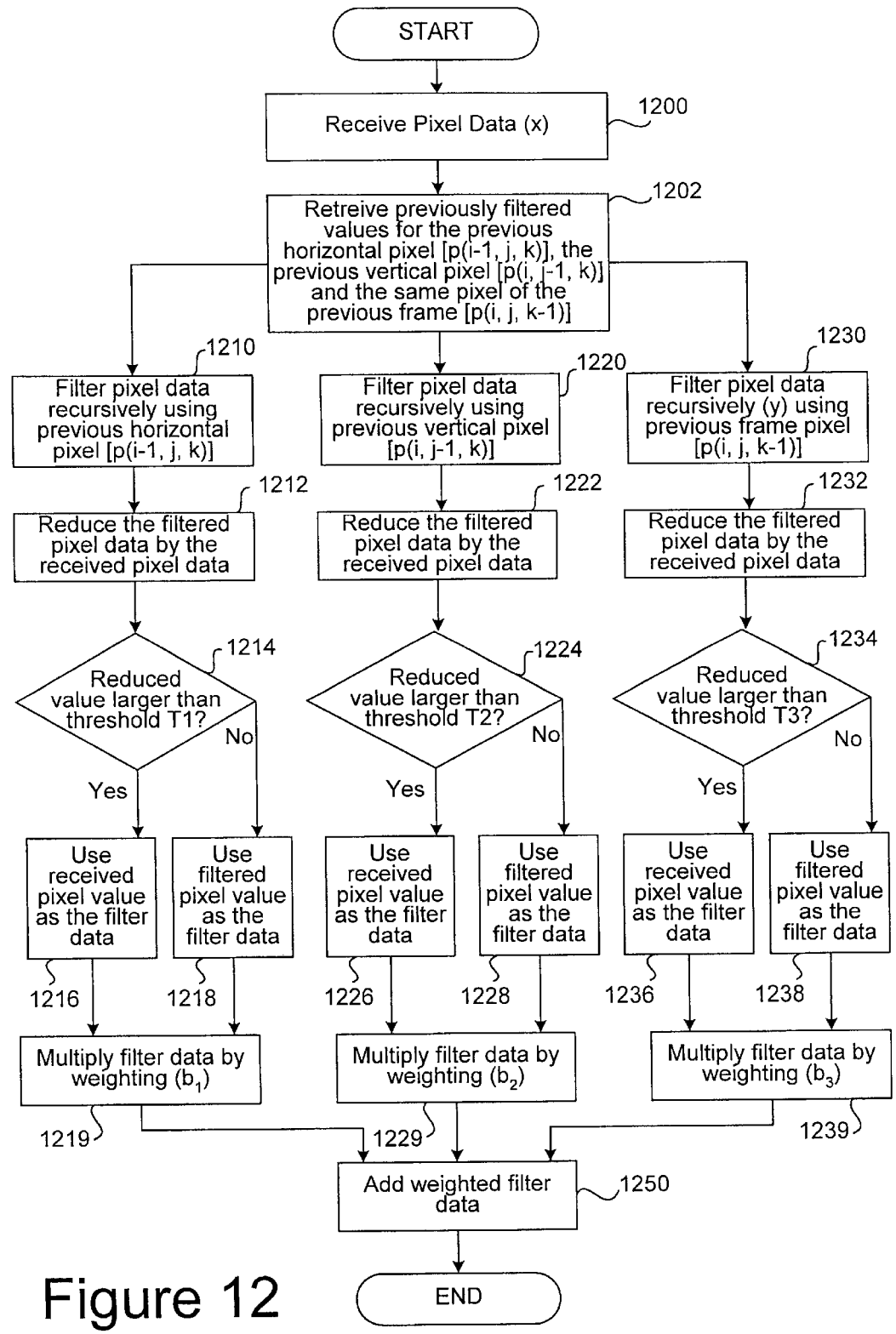
FIG. 12 is a flow chart showing a preferred method for three-dimensional filtering according the preferred embodiment of the present invention.

Referring now to FIG. 12, the preferred method for performing spatial and temporal filtering is shown. The process begins in step 1200, with pixel data x(i, j, k) being received. Next in step 1202, the method retrieves the previously filter value p(i-1, j, k) for the previous horizontal pixel, the previously filter value p(i, j-1, k) for the previous vertical pixel, and the previously filter value p(i, j, k-1) for the same positioned pixel of the previous frame. Those skilled in the art will recognize that these values can either be retrieved from memory or calculated on the fly. Next, the process generates produces three streams or sub-process that may be performed concurrently. A first sub-process including steps 1210, 1212, 1214, 1216, 1218 and 1219 are used to produce a filtered pixel value that is filtered horizontally and then multiplied by a weighting value. The second sub-process including steps 1220,1222, 1224, 1226,1228 and 1229 performs a similar filtering process but for the vertical direction. Finally, a third sub process including steps 1230,1232,1234,1236,1238 and 1239 performs a similar filtering process but for the temporal domain using a filtered data from a previous frame.

Focusing more particularly on the first sub-process, it begins in step 1210 by filtering the received data recursively with an IIR filter to produce a filtered pixel value $p_1(i, j, k)$. In particular, the method uses the received pixel data x(i, j, k) and the previously filter value p(i-1, j, k) for the previous horizontal pixel. Then in step 1212, the filtered pixel value $p_1(i, j, k)$ is reduced by the received pixel value $x(i, j, k)$. Then in step 1214, the absolute value of the difference is compared with a first threshold value, $T_1$. If the difference is larger than the threshold $T_1$, then the method continues in step 1216 and outputs the received pixel value $x(i, j, k)$ as the filtered value. If the difference is not less than the threshold, then the method continues in step 1218. In step 1219, the method multiples the filtered pixel value from either step 1216 or 1218 by a weighting value. The product of step 1219 is then output to step 1250 where it is summed with the outputs of the other sub-processes. The other sub-processes perform similar steps except that the second sub-process uses the previously filtered value for the previous vertical pixel $p(i, j-1, k)$, a second filter value $a_2$, a second threshold $T_2$ and a second weighting $b_2$. The third sub-process is similar to the other two sub-processes, but uses the previously filtered value $p(i, j, k-1)$ for the previous frame, a third filter value $a_3$, a third threshold $T_3$ and a third weighting value $b_3$.

Figure 13:
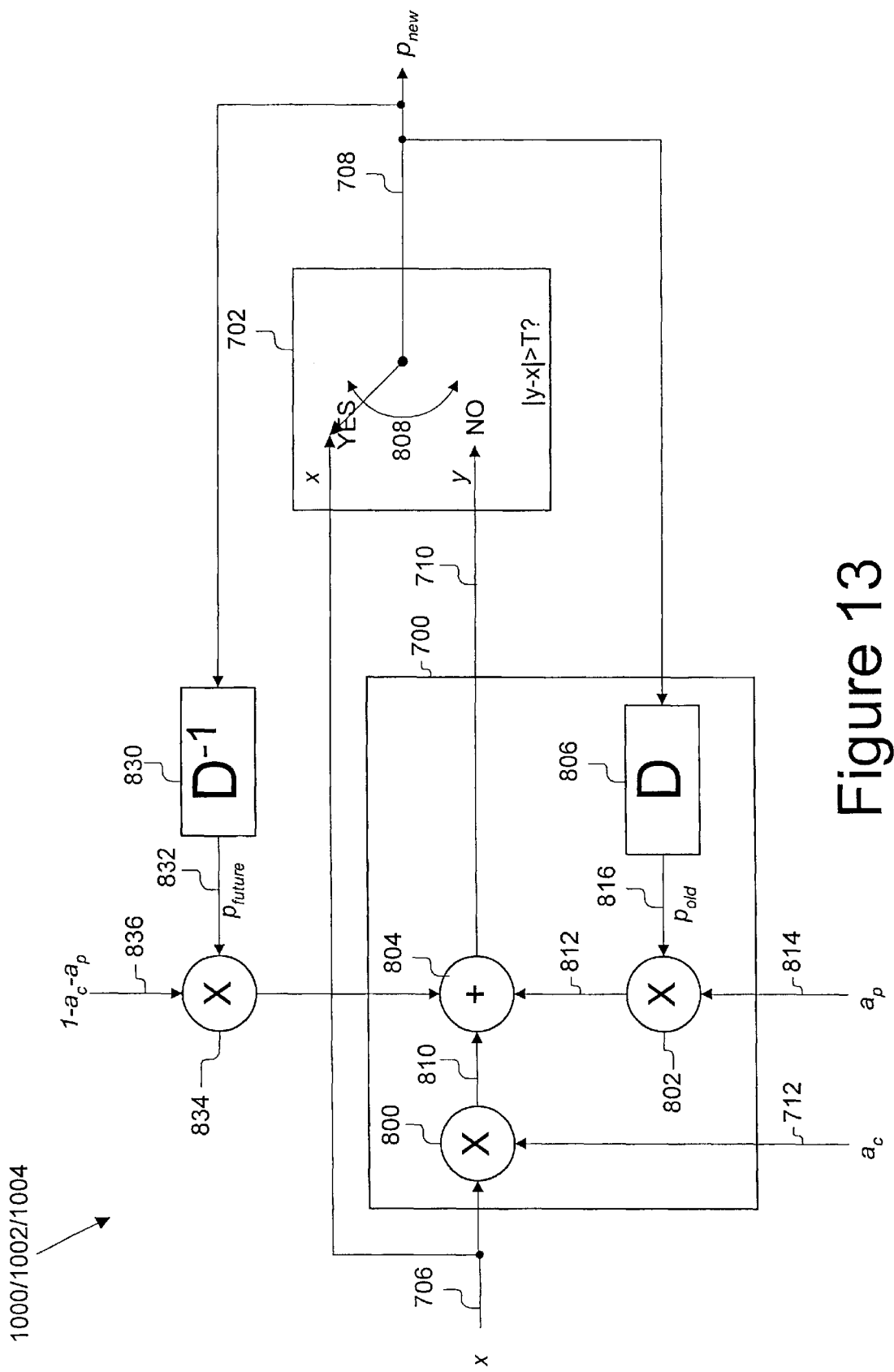
FIG. 13 is a schematic diagram showing a second embodiment of a one-dimensional filter, $F_m$, constructed according to the present invention.

Referring now to FIG. 13, yet another embodiment of the filter 1000/1002/1004 is shown. This embodiment of the one-dimensional filter is similar to that shown in FIG. 10 and described above, except that the filter 1000/1002/1004 also includes data regarding the filtering of future pixels. In particular, the embodiment of FIG. 13 further comprises: a look-ahead unit 830 and a multiplier 834. The look-ahead unit 830 has an input and an output, and generates a filtered value for future pixels based upon the value of the pixel presently being filtered. Such look-ahead units are conventional in the art. The input of the look-ahead unit 830 is coupled to line 708 to receive the value of the pixel being filtered, $P_{new}$. The output of the look-ahead unit 830 is coupled to a first input of the multiplier 836. The second input of the multiplier 836 is coupled to receive a coefficient value from the coefficient register 704 (not shown in FIG. 13). In particular, the second input of the multiplier 836 is coupled to receive a value of $1-a_c-a_p$. $a_c$ is a filtering coefficient for current pixel based on the absolute difference, $a_p$ is a filtering coefficient for future pixel based on the absolute difference, and $a_p$ is a filtering coefficient for past pixel based on the absolute difference. This embodiment is also different that of FIG. 10 because different coefficients are provided to the first multiplier 800 and the second multiplier 802. The second input of the first multiplier 800 is coupled to the coefficient register 704 to receive coefficient $a_c$ on line 712, and the second input of the second multiplier 802 is coupled to receive a second coefficient value, $a_p$ on line 814.

While the present invention has been described with reference to certain preferred embodiments, those skilled in the art will recognize that various modifications may be provided. These and other variations upon and modifications to the preferred embodiments are provided for by the present invention.

What is claimed is:

1. A spatial and temporal filter comprising:
   a first filter having a first and second inputs and an output for filtering in a horizontal dimension, the first input coupled to receive original pixel data, and the second input coupled to receive a previous filtered pixel value;
   a second filter having a first and second inputs and an output for filtering in a vertical dimension, the first input of the second filter coupled to receive original pixel data, and the second input of the second filter coupled to receive a previous filtered pixel value for a previous line;
   a third filter having a first and second inputs and an output for filtering in a temporal dimension, the first input of the third filter coupled to receive original pixel data, and the second input of the third filter coupled to receive a previous filtered pixel value for a previous frame; and
   an adder having a first input, a second input and a third input, for summing signals received, the first input of the adder coupled to the output of the first filter, the second input of the adder coupled to the output of the second filter, and the third input of the adder coupled to the output of the third filter.

2. The spatial and temporal filter of claim 1, wherein the first, second and third filters are IIR filters.

3. The spatial and temporal filter of claim 1, further comprising a coefficient register for storing coefficients used for filtering, the coefficient register coupled to the first, second, and third filters.

4. The spatial and temporal filter of claim 3, wherein the coefficient register includes:
   a first coefficient register for storing a first coefficient that controls the amount of filtering that is applied by the first, second and third filters;
   a second coefficient register for storing threshold values that determine the sensitivity of the first, second and third filters to the spatial and temporal changes; and
   a third coefficient register for storing weighting values that determine the relative amount of filtering for each dimension that is applied by the first, second in their filters.

5. The spatial and temporal filter of claim 4, wherein the first coefficient register provides a coefficient value for each of the first, the second and the third filters and the second coefficient register provides the threshold value for each of the first, the second and the third filters.

6. The spatial and temporal filter of claim 1, further comprising a buffer for storing filter values of a previous frame, the buffer having an input and output, the output of the buffer coupled to the second input of the third filter.

7. The spatial and temporal filter of claim 6, wherein the buffer is a frame buffer.

8. The spatial and temporal filter of claim 1, further comprising a buffer for storing filter values of a previous line, the buffer having input and output, the buffer coupled to the second input of the second filter.

9. The spatial and temporal filter of claim 8, wherein the buffer is a line buffer.

10. The spatial temporal filter of claim 1, further comprising a buffer for storing a filtered value of a previous pixel, the buffer having an input and an output, the buffer coupled to the second input of the first filter.

11. The spatial and temporal filter of claim 1, further comprising:
   a first multiplier, having an first input, a second input and an output, the first input of the first multiplier coupled to the output of the first filter, the second input of the first multiplier coupled to receive a first weighting value, and the output of the first multiplier coupled to the first input of the adder;
   a second multiplier having a first input, a second input and an output, the first input of the second multiplier coupled to the output of the second filter, the second input of the second multiplier coupled to receive a second weighting value, and the output of the second multiplier coupled to the second input of the adder; and
   a third multiplier having a first input, a second input and an output, the first input of the third multiplier coupled to the output of the third filter, the second input of the third multiplier coupled to receive the third weighting value, and the output of the third multiplier coupled to be third input of the adder.

12. The spatial and temporal filter of claim 1, wherein the first, second, and third filters each comprise:

a coefficient register for storing coefficients used for filtering the coefficient register having an input for providing the coefficients;

a threshold unit having a first input, a second input, a third input and an output, for outputting a signal on the first input of the threshold unit or a signal on the second input of the threshold unit in response to a signal at the third input of the threshold unit, the second input of the threshold unit coupled to receive pixel data, the third input of the threshold unit coupled to the output of the coefficient register; and an IIR filter having a plurality of inputs and an output, a first input of the IIR filter coupled to the coefficient register, a second input of IIR filter coupled to receive previously filtered pixel data, and the third input coupled to receive pixel data, the output of the IIR filter coupled to the first input of the threshold unit.

13. The spatial and temporal filter of claim 12, wherein the first, second, and third filters each further comprises a delay unit, having an input and an output, the input of the delay unit coupled to the output of the respective first, second, or third filter, the output of the delay unit providing previously filtered pixel data and being coupled to an input of the respective first, second or third filter.

14. The spatial and temporal filter of claim 12, wherein threshold unit selects between outputting a signal on the first input of the threshold unit or signal on the second input of the threshold unit by comparing a threshold value received on the third input of the threshold unit to the absolute value of the difference between the signal on the first input threshold unit and the signal on the second input of the threshold unit.

15. The spatial and temporal filter of claim 12, wherein the IIR filter further comprises a first multiplier, the second multiplier and an adder.

16. The spatial and temporal filter of claim 12, wherein the first, second, and third filters each further comprises a look-forward unit, having an input and an output, the input of the look-forward unit coupled to the output of the respective first, second, or third filter, the output of the look-forward unit providing future filtered pixel data and being coupled to an input of the respective first, second or third filter.

17. A method for spatial temporal filtering comprising the steps of:

receiving pixel data;

filtering pixel data recursively to produce filtered pixel data;

reducing the filtered pixel data by the received pixel data;

receiving a threshold value;

comparing the reduced filtered pixel data to the threshold value;

providing the received pixel data as output data if the reduced filtered pixel data is larger than the threshold value; and providing the filtered pixel data as output data if the reduced filtered pixel data is not larger than the threshold value.

18. The method for spatial filtering of claim 17, wherein the step of filtering concurrently filters pixel data in the horizontal, vertical and temporal dimensions.

19. The method for spatial filtering of claim 17, further comprising the step of receiving previously filtered pixel data.

20. The method for spatial filtering of claim 19, wherein the step of receiving previously filtered pixel data comprising the steps of:

receiving previously filtered values for a previous horizontal pixel;

receiving previously filtered values for a previous vertical pixel; and receiving previously filtered values of the same pixel of the previous frame.

21. The method for spatial filtering of claim 16, further comprising the steps of:

receiving a weighting value; and multiplying be output data by the weighting value.

* * * * *